Sept. 16, 1947.  L. W. SIMONS  2,427,536
BENDING TOOL USED IN CORRECTING CAMBER AND CASTER OF A STEERING KNUCKLE
Filed Oct. 16, 1944
Fig. 1
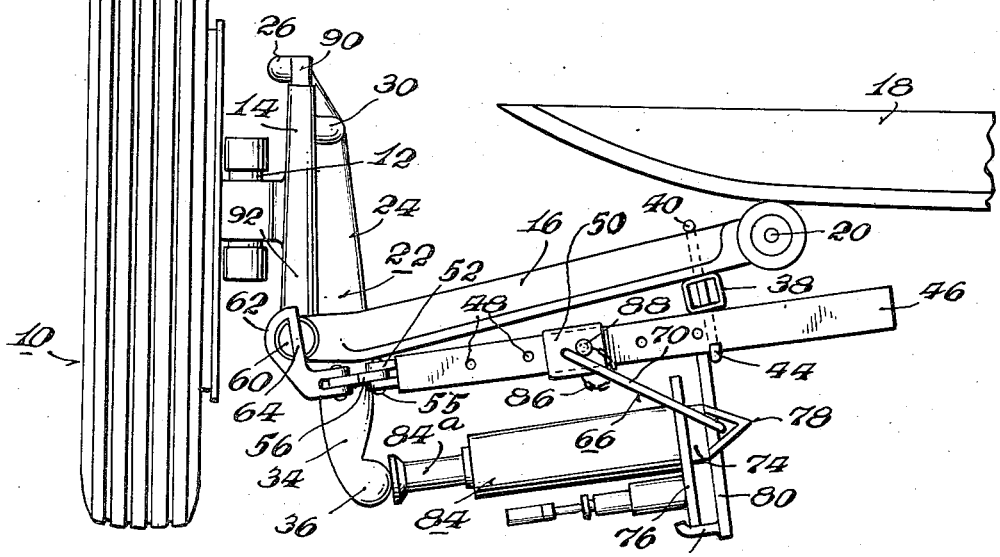
Fig. 2
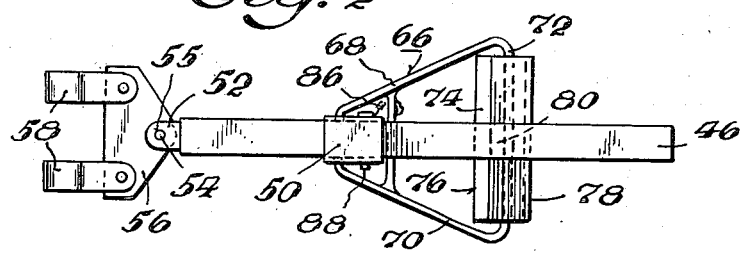
Fig. 3
Fig. 4
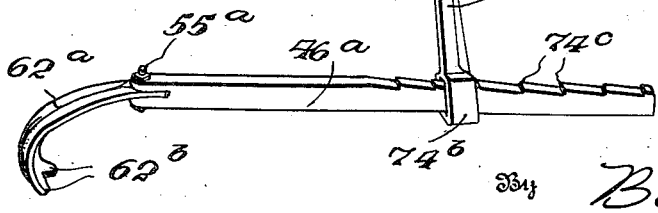
Inventor
L. W. Simons,
By Barry & Cyr
Attorneys Patented Sept. 16, 1947

2,427,536

UNITED STATES PATENT OFFICE 2,427,536

BENDING TOOL USED IN CORRECTING CAMBER AND CASTER OF STEERING KNUCKLES

Lowell W. Simons, Long Beach, Calif.

Application October 16, 1944, Serial No. 558,858

6 Claims. (Cl. 153—32)

This invention relates to abutment and jack supporting means for use with a bending tool for correcting both camber and caster of the steering knuckle support arm of an automobile, and the present application is a continuation in part of my application, Serial No. 447,597, filed June 18, 1942, Patent 2,365,731, dated December 26, 1944.

In present day automobiles utilizing knee-action, or individual wheel control, the steering support arm or "king pin support arm" upon becoming knocked out of line loses both camber and caster to cause a distorted alignment of the wheels of the automobile, which is turn creates undue wear and tear on the rubber tires provided thereon. This invention contemplates means to be employed in connection with a correction tool for adjusting both the proper camber and caster of the steering knuckle in one operation.

An object of this invention is to provide a hydraulic jack support and abutment means of such construction that a steering knuckle bending tool may be actuated by hydraulic pressure applied below the A-frame of an automobile whereby a safer and more effective force is applied to such tool.

Other objects and advantages of the invention will be evident from the following detailed description read in conjunction with the accompanying drawings which illustrate two forms of my invention.

In the drawings:

Figure 1 is a view in front elevation showing one form of the invention in use on one wheel of an automobile having certain parts broken away for better illustration.

Figure 2 is a top plan view of the jack abutment means and pressure bar shown in Figure 1.

Figure 3 is a side elevational view of the hold bar shown in Figure 1.

Figure 4 is a perspective view of a modification of a detail, in inverted position.

Referring to Figures 1 to 3 of the drawings in detail, 10 designates the wheel and tire of an automobile having the usual king pin 12 and king pin support arm or steering knuckle support arm 14 cooperating with the A-frame 16 of the automobile. The A-frame 16 is attached to the main frame 18 as shown at 20 in any conventional manner. It will be apparent that the automobile structure forms no part of this invention and the bending tool hereinafter referred to can be applied to any type or make of automobile utilizing individual wheel control.

The bending or correction tool 22, claimed in the above mentioned patent application, is formed with a body portion 24 having its upper end provided with an outwardly extending hook or finger 26. At a point below the finger 26 the body is provided with a second outwardly projecting hook or thumb 30 for a purpose hereinafter described. The lower portion of the body 24 terminates in an angularly disposed leg member 34 having an outwardly projecting foot 36.

In order for the bending tool 22 to apply pressure when the finger 26 and thumb 30 grasp the steering arm support, a hold bar 38 is placed below the A-frame and connected thereto by threaded hooks 40 which extend loosely through the hold bar and cooperate with adjustable wing nuts 42 (Fig. 3). As shown in Figure 3, two hooks 40 are sufficient to support the hold bar 39, but it will be understood that any number may be utilized as desired. A similar threaded hook 44 is supported by the bar 38, but has its hook portion extending in a direction opposite to that of hooks 40 in order to assist in the support of a pressure bar 46. The pressure bar is hollow and of rectangular cross section and it has a plurality of aligned horizontal apertures 48. A slidable member 50 is carried by the bar 46 for a purpose hereinafter set forth. One end of the pressure bar 46 is provided with a bifurcated or yoke connection 52 having aligned apertures 54. A rockable plate 56 is pivotally secured in the yoke by means of a rivet 55 extending through the apertures 54 and an aperture (not shown) in the plate. A pair of freely movable retaining members 58 of a retaining device, are secured at opposite ends of the plate 56 and are adapted to embrace the ends of a pivot bushing 60 arranged at the outer end portion of the A-frame 16. The members 58 also assist the hold bar 38 in supporting the pressure bar 46 immediately under the A-frame 16.

The members 58 are formed with semi-circular portions 62, the ends of each of which are connected by a bar or bracket 64. For application of the members 58 to the pivot bushing 60, the members are swung away from one another in order to facilitate the operation. Upon swinging back into position shown in Fig. 2, the pivot bushing is engaged by the portions 62, so that the king pin supporting arm 14 is disposed directly between the members 58. In this manner regardless of any angular movement of the plate 56, the arm 14 is always on center with respect to the members 58.

A substantially triangular bail 66 is welded to opposite sides of the slidable member 50. It comprises diverging legs 68 and 70 interconnected by a cross bar 72. A freely rotatable bar or abutment 74 having a flat face 76 is pivotally secured to the bar 72 by an angle bar 78 welded thereto. A perpendicularly disposed bar 80 is welded to the opposite face of the bar 74, for a purpose hereinafter set forth. The lower portion of the bar 80 is provided with a hook 82 for supporting a pressure jack 84 as will be hereinafter described.

It will be apparent that the aligned apertures 48 provide adjustment for the slidable member 50 on the pressure bar 46. A bolt chain 86 is welded to the bracket 66 and carries a pin 88 adapted to be inserted through the apertures 48 and the member 50 for holding the latter and its complementary bracket 66 in any adjusted position desired. From Figure 1, it will be apparent a conventional jack 84 is adapted to be disposed between the foot 36 and the flat face 76 of the bar 74. Obviously, the adjustment of the slidable member 50 will permit various sized jacks to be utilized with the pressure bar 46. In practice jacks from 6 to 26 inches long have been used.

The base of the jack 84 is adapted to rest on the hook 82 while the jack piston 84a contacts the foot 36. The bar 74 is rotatable about bar 72, so that the flat face 76 contacts the jack base to provide proper alignment of the jack in directing a positive force against the foot 36. With the jack in position, the bar 80 contacts the bottom of the pressure bar 46 to assist in maintaining the jack and bar 74 in proper position.

In the modification shown in Fig. 4, the pressure bar 46a is adapted to be secured to the hold bar 38 in the same manner as illustrated in Fig. 1, but in the modification a hook-shaped retaining device 62a is pivotally connected to one end of the pressure bar by means of a vertically disposed bolt 55a. The retaining device has a plurality of retaining members 62b adapted to engage the pivot bushing 60 at the outer end of the A-frame 16. An abutment 74a has a loop 74b that is slidable along the pressure bar, and the latter has rack teeth 74c cooperating with the loop to hold the abutment in various positions of adjustment. It will be obvious that the abutment 74a will serve the same purpose as the bars 74 and 80 in Fig. 1.

*Operation*

In operation, the correction tool 22 is disposed adjacent the king pin support arm 14 so that the finger 26 bears against one side of the periphery of the arm 14 in proximity of the top 90 thereof, while the thumb 30 bears against the opposite side at a point below the top portion 90. The leg of the body 24 extends below the arm 14 and pivot bushing 60 so that the angular leg 34 and its foot 36 extend into a position for the latter to be contacted by the jack piston 84a. In practice it has been found that a retaining block (not shown) may be placed between the top of the king pin arm 14 and a portion of the frame of the car (not shown) in order to hold the car at road level. The disposition of the tool 22, as shown in Figure 1, is such as to put in camber or adjust the wheel for more camber. Upon application of pressure by the jack 84 against the foot 36 there is a reacting force in an opposite direction by the finger 26. As a consequence, force and pressure is applied by the thumb 30 against the upper arm portion of the arm 14, causing the upper half of the arm 14 to be bent in a direction away from the wheel 10, thereby changing the angle of the king pin 12 to whatever degree desired, and thus decrease the camber of the wheel.

It will be apparent that the correct camber can be determined by any conventional camber gauge. In the event there is a distortion of the caster as well as the camber, the tool 22 can be rotated about the arm 14, as desired, to change the circumferential position of the finger 26 and thumb 30 with a complementary movement of the foot 36. In this manner upon the application of force by the jack 84 in addition to adjusting camber as above described, the thumb and finger simultaneously adjusts the caster to any degree as determined by the adjusted circumferential position of the tool 22. In order to assure a direct and effective force by the jack 84 against the foot 36 in adjusting caster, any rotation of the tool on the arm 14 is compensated for by the rocking plate 56.

With the pressure bar 46 and jack moved to the adjusted angular position of the tool, the plate 56 is oscillatable with respect to the bar 46, and assures positive support therefor, as well as a direct force by the jack against the foot 36. The bar 74 assists in maintaining the jack in proper alignment.

In order to take out or decrease the camber of the wheel, the tool 22 is so connected to the arm 14 that the thumb 30 is disposed below its middle and at the lower half 92 of the arm 14, whereby upon application of pressure against the foot 36 by the jack 84, the thumb 30 directs a force against the lower half of the arm 14 to bend the arm toward the wheel by changing the angle of the king pin 12 so that the camber is decreased or taken out of the wheel. It will be apparent that any angular adjustment of the tool 22 in this lower position can simultaneously adjust the caster as above described.

In the present disclosure (Fig. 1) the tool has been shown arranged on the arm 14 at a point in the rear of the frame 16 and arm 14 of the right front wheel of the automobile. The tool 22 in this application is termed a right-handed tool. However, it will be apparent that camber and caster can be corrected on the king pin arm of the right wheel (as shown) with a tool arranged in the front or an opposite position on the arm from that shown in Figure 1. While this disclosure is not shown, the utilization of a bending tool in front is termed a left-handed tool and differs from the right-handed tool in the arrangement of the finger 28, thumb 30 and foot 36. In utilizing a left-handed tool in front of the arm 14, the tool is constructed so that the direction of the hooked portions of the finger and thumb respectively are in an opposite direction from those in the right-handed tool (as shown). Similarly the foot 36 projects from the opposite side of the angular leg 34 to a greater extent than in that of a right-handed tool. The simultaneous adjustment of camber and caster can be achieved from the front of the arm 14 with a left-handed tool in the same manner as above described. In practice the tool disclosed in Figure 1 is classified as a right handed tool for the right front wheel of an automobile, but as a left handed tool for the left front wheel of an automobile by merely changing the position with which the tool engages the arm 14 of a respective wheel of an automobile.

From the foregoing it will be apparent that the invention contemplates a simple, accurate and expeditious tool for simultaneously correcting the camber and caster of a steering knuckle of an automobile utilizing individual wheel control. Furthermore, the camber and caster correction can be made without removing any parts of the steering arm.

Changes may be made in the combination and arrangement of parts as heretofore set forth in the specification and shown in the drawing, it being understood that any modification in the precise embodiment of the invention may be made within the scope of the claims without departing from the spirit of the invention.

What I claim and desire to secure by Letters Patent is:

1. In a device of the character described, a pressure bar adapted to extend crosswise of the front portion of a motor vehicle, a hold bar provided with means for detachably connecting the pressure bar to the chassis of the vehicle, a retaining device pivotally connected to one end of the pressure bar for movement about a substantially vertical axis and provided with retaining members adapted to connect with the outer end portion of an A-frame of said chassis, and an abutment adjustably connected with and depending from the pressure bar to be engaged by the base of a hydraulic jack used in applying pressure to a bending tool, in correcting chamber and caster of a steering knuckle of the vehicle.

2. In a device of the character described, a pressure bar adapted to extend crosswise of the front portion of a motor vehicle, means for detachably connecting the bar to the chassis of the vehicle, a plate pivotally connected to one end of the bar for movement about a substantially vertical axis, a pair of retaining members, each pivotally connected to the plate for movement about a substantially vertical axis, said members being adapted to engage the pivot bushing at the outer end portion of an A-frame of said chassis, and an abutment operatively connected with and depending from the bar for use in applying pressure to a bending tool in correcting camber and caster of a steering knuckle of a vehicle.

3. In a device of the character described, a pressure bar adapted to extend crosswise of the front portion of a motor vehicle, means for detachably connecting the bar to the chassis of the vehicle, a plate pivotally connected to one end of the bar for movement about a substantially vertical axis, a pair of retaining members, each pivotally connected to the plate for movement about a substantially vertical axis, said members being adapted to engage the pivot bushing at the outer end portion of an A-frame of said chassis, a member slidable along said bar, means for securing the slidable member to the bar at various points along the length thereof, a bail connected to the slidable member and including a cross bar, and an abutment operatively connected to said cross bar for use in applying pressure to a bending tool in correcting camber and caster of a steering knuckle of a vehicle.

4. In a device of the character described, a pressure bar adapted to extend crosswise of the front portion of a motor vehicle, means for detachably connecting the bar to the chassis of the vehicle, a plate pivotally connected to one end of the bar for movement about a substantially vertical axis, a pair of retaining members each pivotally connected to the plate for movement about a substantially vertical axis, said members being adapted to engage the pivot bushing at the outer end portion of an A-frame of said chassis, a member slidable along said bar, means for securing the slidable member to the bar at various points lengthwise thereof, a bail secured to the slidable member and including a cross bar, and an abutment bar pivotally connected to the cross bar for movement about a horizontal axis, said abutment bar being adapted to provide an abutment for use in applying pressure to a bending tool in correcting camber and caster of a steering knuckle of the vehicle.

5. In a device of the character described, a pressure bar adapted to extend crosswise of the front portion of a motor vehicle, means for detachably connecting the bar to the chassis of the vehicle, a plate pivotally connected to one end of the bar for movement about a substantially vertical axis, a pair of retaining members, each pivotally connected to the plate for movement about a substantially vertical axis, said members being adapted to engage the pivot bushing at the outer end portion of an A-frame of said chassis, each of said members having a substantially vertical bar adapted to engage an end of said pivot bushing, and an abutment operatively connected with and depending from the bar for use in applying pressure to a bending tool in correcting camber and caster of a steering knuckle of a vehicle.

6. In a device of the character described, a hold bar provided with upwardly extending hooks adapted to be secured to a chassis of a vehicle, another hook depending from said bar, a pressure bar supported by the depending hook, a retaining device connected to one end of the pressure bar to connect it to the outer end of an A-frame of said chassis, and an abutment adjustably connected with and depending from the pressure bar to be engaged by the base of a power unit used in applying pressure to a bending tool in correcting camber and caster of a steering knuckle of the vehicle.

LOWELL W. SIMONS.

REFERENCES CITED

The following references are of record in the file of this patent:

UNITED STATES PATENTS

| Number | Name | Date |
| --- | --- | --- |
| 1,818,678 | Bennett | Aug. 11, 1931 |
| 2,348,697 | Smith | May 9, 1944 |